Oct. 31, 1944.  W. J. RUSSELL  2,361,874

HEATER UNIT CONSTRUCTION

Original Filed Sept. 14, 1938

WITNESSES:
Roy N. Enwall
E. H. Lutz

INVENTOR
WILLIAM J. RUSSELL.
BY
ATTORNEY

Patented Oct. 31, 1944

2,361,874

UNITED STATES PATENT OFFICE 2,361,874

HEATER UNIT CONSTRUCTION

William J. Russell, Mansfield, Ohio, assignor to Westinghouse Electric & Manufacturing Company, East Pittsburgh, Pa., a corporation of Pennsylvania Substituted for abandoned application Serial No. 229,851, September 14, 1938. This application April 3, 1941, Serial No. 386,630

1 Claim. (Cl. 219—37)

This application is a substitute for my abandoned application Serial No. 229,851, filed September 14, 1938.

My invention relates to an electric heating unit and more particularly to the heating surface of a range surface unit.

An object of my invention is to provide an efficient, rugged, inexpensive electric heating unit adapted to be used with and readily attached to a range.

Other objects of the invention will either be pointed out specifically in the course of the following description of apparatus embodying my invention or will be apparent from such description.

Figure 1:
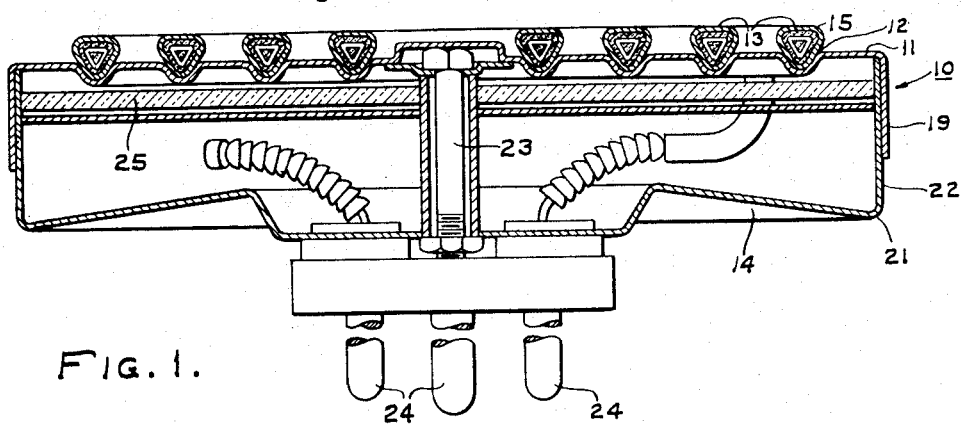
Fig. 1 is a sectional view of a heating unit embodying my invention, taken along the line I—I of Fig. 3.

Referring to the accompanying drawing, I show a heating unit 10 including a flat-surface plate 11 having two elongated spiral grooves 12 formed therein, armored heating elements 13 of substantially triangular cross-section, positioned within the respective grooves 12 and rigidly attached thereto, and a suitable supporting structure 14 for the plate 11 and heating elements 13.

Figure 2:
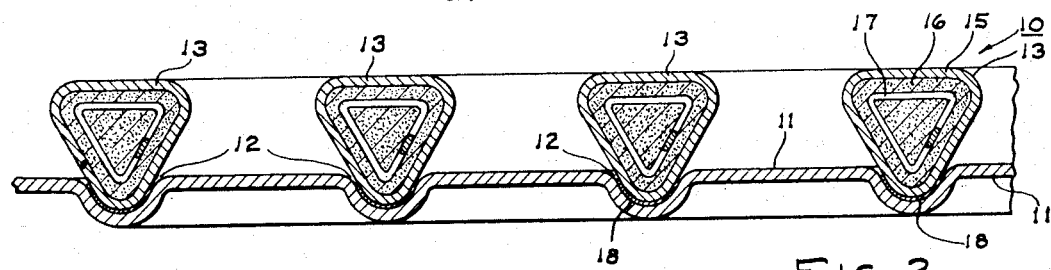
Fig. 2 is an enlarged fragmentary view similar to Fig. 1.
Figure 3:
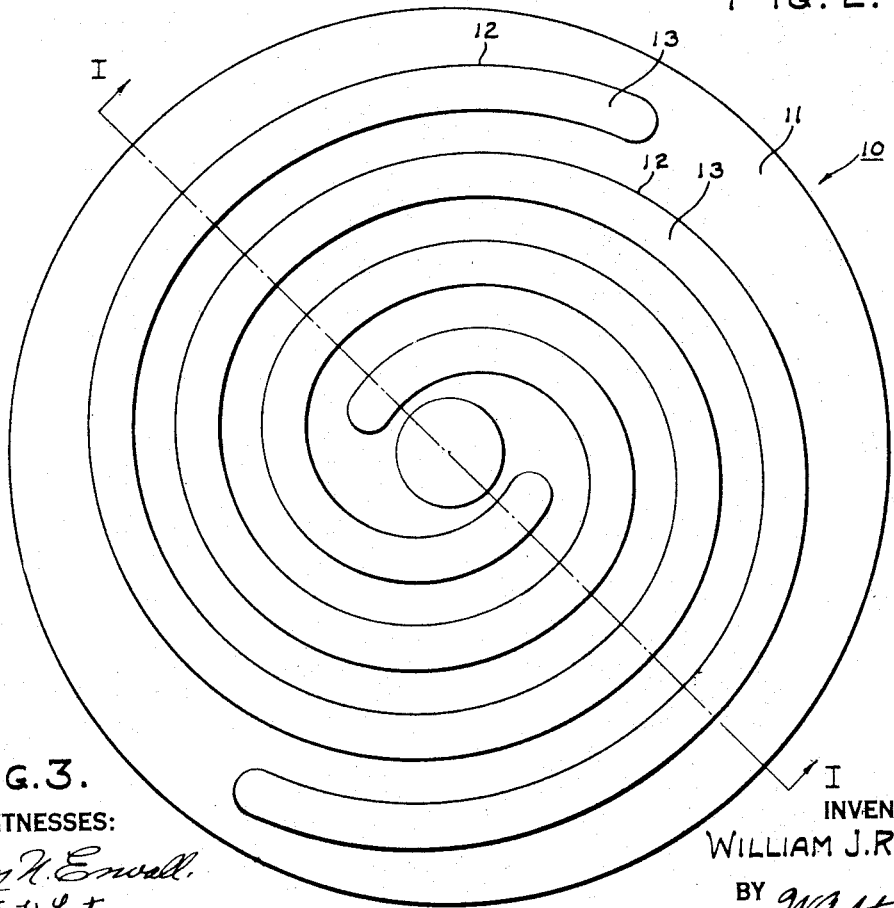
Fig. 3 is a top plan view of the device shown in Fig. 1.

The triangular-sectioned or three-sided armored heating elements 13 each comprise a sheath 15, insulating material 16 and a coiled resistance element 17. The coil 17 is triangular in cross-section and is insulatedly supported within the sheath 15 by means of suitable insulating material 16, such as magnesium oxide, pressed into a solid homogeneous mass substantially as shown in Figs. 1 and 2. The metallic armor or sheath 15 is also triangular in cross-section and permits cooking vessels or the like to be freely placed on the flat upper surface thereof without any danger of injuring the heating element. In addition, this metallic sheath permits the heating element 13 to be rigidly attached to the top surface of the plate 11 as by brazing or welding the sheath to the wall of the elongated grooves 12 substantially as shown at 18 in Fig. 2.

The flat-surface plate 11 is, in this instance, formed from any well-known material which will permit the heating unit to operate at a red heat. The plate 11 is preferably formed in a single die-casting operation, the elongated grooves 12 being formed therein to conform to the configuration of the heating elements 13. This plate has a depending side portion 19 which cooperates with the supporting structure 13 to form an integral unit, as hereinafter described.

It is apparent that the efficiency of the heating unit will be high, inasmuch as cooking vessels placed thereon are in direct contact with the heating elements over a large area provided by the flat upper sides of the heating elements. Further, a portion of the heat produced within the heating elements radiates from the lower walls thereof and is reflected upwardly toward the cooking vessel by the flat-surface plate 11. In addition, a portion of the heat produced within the heating elements is directly conducted therefrom to the flat-surface plate 12, permitting a large portion of such conducted heat to be directly radiated to the bottom surface of the cooking vessel. These additional paths for the transfer of heat from the armored elongated heating elements 14 to the cooking vessel are an important factor in materially increasing the heating efficiency of the heating unit 10.

The flat-surface plate 11 may be operatively associated with the supporting structure 14 through the cooperation of the depending side portion 19 of the plate 11. The supporting structure 14 is preferably formed of a dish-shaped member 21 having an upwardly-extending side wall 22 to cooperate with the depending portion 19 of the plate 11. The plate 11, including the rigidly attached heating elements 13 is positioned over the supporting structure 14, whereupon the depending side portion 19 of the plate 11 engages the upwardly-extending side portion 22 of the structure 13. In addition, a bolt 23 rigidly attached to the central portion of the plate 11 may be rigidly attached to the supporting structure 14 so as to form an integral unit therewith. A plurality of terminals 24 extending from the heating elements may be positioned at the lower portion of the supporting structure 14 to afford cooperation with a suitable power supply. In addition, if desired, a heat-insulating or heat-reflecting member 25 may be positioned intermediate the surface plate 11 and the lower portion of the supporting structure 14 to retard the downward travel of heat and to reflect such downwardly-traveling heat upwardly.

It is to be understood that the supporting structure 14 as hereinabove described is merely included to form a complete heating unit, and that such supporting structure is not to be considered a part of my invention.

Various further modifications may be made in the device embodying my invention without departing from the spirit and scope thereof, and I desire, therefore, that only such limitations shall be placed thereon as are imposed by the prior art and the appended claim.

What I claim is:

An electrical heating unit comprising in combination, a substantially flat-surfaced plate having a spirally-wound groove therein, a coiled resistance element, said coil being substantially triangular in cross section, a metallic tubular sheath completely encircling said resistance element, solid electrical insulating material filling the remaining space within said sheath and insulating said resistance element from said sheath, the cross-section of said tubular sheath in the usable heating portion thereof comprising three flat side wall portions disposed in triangular formation and three rounded connecting portions joining said side wall portions at the three apices of the triangular formation, the side wall portions of said sheath being substantially parallel to adjacent sides of said coil, said sheath being coiled in a flat spiral with one of the flat side wall portions disposed in a plane and disposed with the rounded connecting portion opposite the last-mentioned side wall portion down within said groove and in contact with said plate, and means for rigidly attaching said sheath to said plate.

WILLIAM J. RUSSELL.